US012752489B2

(12) United States Patent
Bromberg et al.

(10) Patent No.: US 12,752,489 B2
(45) Date of Patent: Oct. 6, 2026

(54) LIQUID AND POWDER MATERIAL HANDLING SYSTEMS WITHIN ADDITIVE MANUFACTURING AND METHODS FOR THEIR USE

(71) Applicant: General Electric Company, Schenectady, NY (US)

(72) Inventors: Vadim Bromberg, Niskayuna, NY (US); Victor Fulton, Amelia, OH (US); Carlos H. Bonilla, Lebanon, OH (US); Joshua Tyler Mook, Cincinnati, OH (US); Anthony Charlebois, Saint-Eustache (CA); Ryan William Van Deest, West Chester, OH (US); Cassidy C. Shibiya, Harrison, OH (US); Timothy Francis Andrews, Sharonville, OH (US); Alex W. Ariapad, West Chester, OH (US); Mathieu Roy, Saint-Eustache (CA); Patrick Leduc, St-Colomban (CA); Simon Houle, Saint-Eustache (CA); Jean-Francois Cadorette, Saint-Eustache (CA); Patrick Gauthier, Saint-Eustache (CA); Jay Matthew Lang, Adena, OH (US)

(73) Assignee: General Electric Company, Evendale, OH (US)

( * ) Notice: Subject to any disclaimer, the term of this patent is extended or adjusted under 35 U.S.C. 154(b) by 96 days.

(21) Appl. No.: 18/492,096

(22) Filed: Oct. 23, 2023

(65) Prior Publication Data

US 2024/0157646 A1 May 16, 2024

Related U.S. Application Data

(60) Provisional application No. 63/383,404, filed on Nov. 11, 2022.

(51) Int. Cl.
*B29C 64/336* (2017.01)
*B29C 64/165* (2017.01)
(Continued)

(52) U.S. Cl.
CPC .......... *B29C 64/336* (2017.08); *B29C 64/165* (2017.08); *B29C 64/357* (2017.08); *B33Y 10/00* (2014.12); *B33Y 30/00* (2014.12)

(58) Field of Classification Search
CPC .................................................. B29C 64/336
See application file for complete search history.

(56) References Cited

U.S. PATENT DOCUMENTS 4,401,740 A 8/1983 Kawabata et al.
4,735,144 A 4/1988 Jenkins
(Continued)

FOREIGN PATENT DOCUMENTS

CN 111361154 A * 7/2020 ......... B29B 17/0404
DE 102013215748 A1 * 2/2015 ........... B29C 64/357
(Continued)

OTHER PUBLICATIONS

Machine translation of DE-102013215748-A1, retrieved from USPTO database Feb. 7, 2026 (Year: 2026).*
(Continued)

*Primary Examiner* — Timothy Kennedy
(74) *Attorney, Agent, or Firm* — Dinsmore & Shohl LLP

(57) ABSTRACT

The present disclosure is directed to additive manufacturing systems, components therein, and methods for their use. The additive manufacturing system comprises a powder material handling system comprising a virgin powder inlet. The virgin powder inlet is coupled to a virgin powder drum and configured to receive a virgin powder from the virgin powder drum. The additive manufacturing system further comprises a liquid material handling system comprising a
(Continued)

binder inlet. The binder inlet is coupled to a binder drum and configured to receive a binder from the binder drum. The additive manufacturing system also comprises an additive manufacturing machine coupled to the powder material handling system and the liquid material handling system. The additive manufacturing machine receives the virgin powder and the binder from the powder material handling and liquid material handling systems and is configured to manufacture a work product using the virgin powder and the binder.

12 Claims, 7 Drawing Sheets

(51) Int. Cl.

| | |
|---|---|
| ***B29C 64/357*** | (2017.01) |
| *B33Y 10/00* | (2015.01) |
| *B33Y 30/00* | (2015.01) |

(56) References Cited

U.S. PATENT DOCUMENTS

| | | | | |
|---|---|---|---|---|
| 7,887,316 | B2 * | 2/2011 | Cox | B29C 64/357 425/375 |
| 9,855,704 | B2 | 1/2018 | Miyano et al. | |
| 9,908,293 | B2 | 3/2018 | Yoo et al. | |
| 10,058,920 | B2 | 8/2018 | Buller et al. | |
| 10,780,496 | B2 | 9/2020 | Herzog | |
| 10,828,824 | B2 | 11/2020 | Sheinman | |
| 10,870,237 | B2 | 12/2020 | Kao et al. | |
| 2004/0012112 | A1 | 1/2004 | Davidson et al. | |
| 2010/0247703 | A1 * | 9/2010 | Shi | B33Y 40/00 425/375 |
| 2013/0209282 | A1 * | 8/2013 | Mauchle | F04D 7/00 417/65 |
| 2017/0326792 | A1 | 11/2017 | Paternoster et al. | |
| 2018/0021855 | A1 * | 1/2018 | De Lajudie | B33Y 10/00 419/26 |
| 2018/0111319 | A1 | 4/2018 | Brezoczky et al. | |
| 2018/0250845 | A1 * | 9/2018 | Gaignon | B28B 1/001 |
| 2018/0304302 | A1 | 10/2018 | Sachs et al. | |
| 2018/0326484 | A1 | 11/2018 | Gonzalez et al. | |
| 2019/0030900 | A1 * | 1/2019 | Iwase | B22F 12/90 |
| 2019/0060998 | A1 | 2/2019 | Kelkar et al. | |
| 2019/0091931 | A1 * | 3/2019 | Chanclon | B33Y 30/00 |
| 2019/0344500 | A1 | 11/2019 | Cote | |
| 2020/0047252 | A1 | 2/2020 | Kritchman et al. | |
| 2020/0230698 | A1 | 7/2020 | de Lajudie et al. | |
| 2021/0178668 | A1 | 6/2021 | Schalk et al. | |
| 2021/0347123 | A1 | 11/2021 | Newell | |
| 2021/0362422 | A1 | 11/2021 | Roman et al. | |

FOREIGN PATENT DOCUMENTS

| | | | |
|---|---|---|---|
| EP | 184994 | A1 | 6/1986 |
| EP | 2180956 | B1 | 12/2010 |
| EP | 1700686 | B1 | 7/2015 |
| EP | 2091718 | B1 | 8/2016 |
| EP | 1707342 | B1 | 1/2018 |
| EP | 3259086 | B1 | 4/2020 |
| EP | 3659729 | A1 | 6/2020 |
| EP | 4029676 | A1 | 7/2022 |
| JP | 2001507295 | A | 6/2001 |
| JP | 2017197840 | A | 11/2017 |
| JP | 2020525324 | A | 8/2020 |
| WO | 1996023647 | A2 | 8/1996 |
| WO | 2007039450 | A1 | 4/2007 |
| WO | 2015141776 | A1 | 9/2015 |
| WO | 2016056567 | A1 | 4/2016 |
| WO | 2017106787 | A2 | 6/2017 |
| WO | 2020194826 | A1 | 10/2020 |
| WO | 2020237143 | A1 | 11/2020 |
| WO | 2020237161 | A1 | 11/2020 |

OTHER PUBLICATIONS

Machine translation of CN-111361154-A, retrieved from USPTO database Feb. 7, 2026 (Year: 2026).*
Extended European Search Report for Application No. 23205206.8 dated Mar. 15, 2024 (15 pages).
Japanese Patent Office Action for Application No. 2023-190690 dated Dec. 2, 2024 (4 pages with English Translation).
Nick Hayes, CMgr FCMI—Volkmann, Inc., "It's Time to Get Serious About Metal Powder Handling for Additive Manufacture", www.volkmannusa.com, 5 pages, Bristol, PA.
Trumpf, "Industrial Part and Powder Management", Technical Data, 4 pages.
Electro Optical Systems (EOS GmbH), "IPM M Powder Station L—The Intelligent Closed-Loop Material Handling Solution Designed Specifically for Industrial 3D Printing", 2 pages, Munich Germany.
Chinese Office Action for Application No. 202311480561.1 issued May 27, 2026 (17 pages with English Translation).

* cited by examiner

LIQUID AND POWDER MATERIAL HANDLING SYSTEMS WITHIN ADDITIVE MANUFACTURING AND METHODS FOR THEIR USE

CROSS REFERENCE TO RELATED APPLICATIONS

This application claims the benefit of priority under 35 U.S.C. § 119 of U.S. Provisional Application Ser. No. 63/383,404 filed on Nov. 11, 2022, the contents of which are relied upon and incorporated herein by reference in their entirety as if fully set forth below.

TECHNICAL FIELD

The present specification generally relates to additive manufacturing systems and methods of using the same.

BACKGROUND

Additive manufacturing systems often require building materials, such as powder and binder, to be loaded into an additive manufacturing machine. The additive manufacturing machine may then use the building materials to manufacture a work product. After the work product is manufactured, the work product and excess building material may be removed from the additive manufacturing machine. In many conventional additive manufacturing systems, the building materials may be loaded into the additive manufacturing machine manually. Similarly, in many conventional additive manufacturing systems, the excess building materials may also be removed from the additive manufacturing machine manually. This may be time consuming and may yield material handling errors. Material handling errors may be especially problematic in cases wherein the building materials are reactive or include a solvent binder. Additionally, such manual loading and removal may expose the building materials and/or the excess building materials to the open environment. This exposure may cause contamination with oxygen or debris, which may decrease the quality and efficacy of the building materials.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

Additional features and advantages of the present disclosure will be set forth in the detailed description, which follows, and in part will be apparent to those skilled in the art from that description or recognized by practicing the embodiments described herein, including the detailed description, which follows the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description, explain the principles and operations of the claimed subject matter.

DETAILED DESCRIPTION

Figure 1:
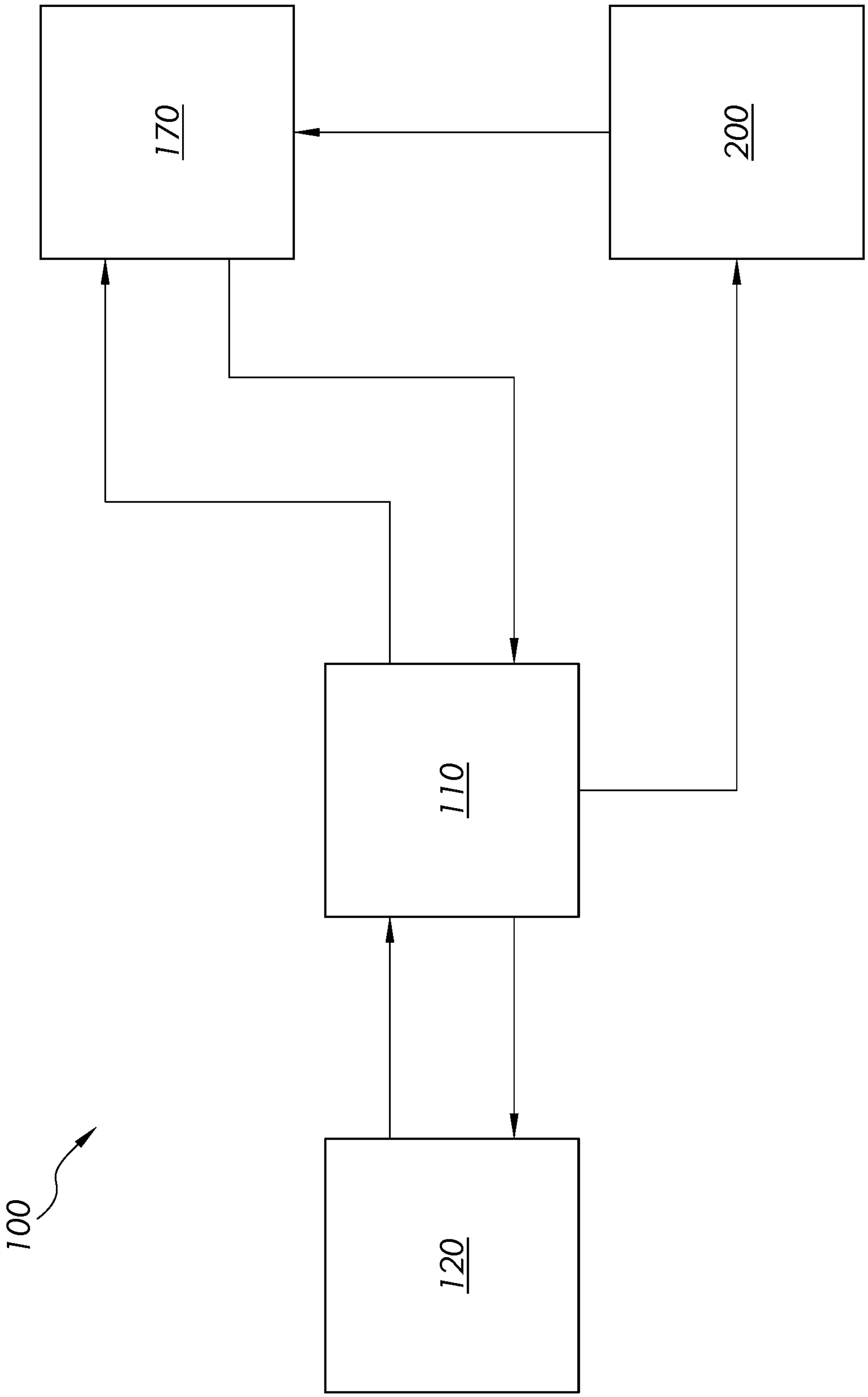
FIG. 1 schematically depicts an illustrative additive manufacturing system, including a liquid material handling system, a powder material handling system, a depowder system, and an additive manufacturing machine.

Reference will now be made in detail to various embodiments of devices, assemblies, and methods, examples of which are illustrated in the accompanying drawings. Whenever possible, the same reference numerals will be used throughout the drawings to refer to the same or like parts. One embodiment of an additive manufacturing system 100 includes an additive manufacturing machine 110 is schematically depicted in FIG. 1. The additive manufacturing machine 110 includes a powder material handling system, depowder system, and a liquid material handling system. The additive manufacturing machine 110 receives a virgin powder from the powder material handling system and receives a binder from the liquid material handling system to manufacture a work product using the virgin powder and the binder. Various embodiments of additive manufacturing systems and methods for using the same are described in further detail herein with specific reference to the appended drawings.

Directional terms as used herein—for example up, down, right, left, front, back, top, bottom—are made only with reference to the figures as drawn and are not intended to imply absolute orientation unless otherwise specified.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any device or assembly claim does not actually recite an order or orientation to individual components, or it is not otherwise specifically stated in the claims or description that the steps are to be limited to a specific order, or that a specific order or orientation to components of an device or assembly is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms “a,” “an,” and “the” include plural referents unless the context clearly dictates otherwise. Thus, for example, reference to “a” component includes aspects having two or more such components, unless the context clearly indicates otherwise.

Additive manufacturing systems utilize building materials, such as powder and binder, by loading the materials into an additive manufacturing machine for use in additive manufacturing. The additive manufacturing machine will then use the building materials to manufacture a work product. Further, large quantities of material are utilized for an additive manufacturing to perform a print cycle to build a work product, and even larger quantities are needed to support the quick changeover for multiple work product manufacture. In existing additive manufacturing machines, these materials are pumped into an intermediary container to be filled in the machine reservoir by hand. However, intermediary containers are not ideal for several reasons.

First, the manual loading of building materials such as powder and binder may be time consuming and may yield material handling errors. Material handling errors may be especially problematic in cases wherein the building materials are reactive or include a solvent binder. Additionally, such manual loading and removal may expose the building materials and/or the excess building materials to the open air. Moreover, this exposure may cause contamination with oxygen or debris, which may decrease the quality and efficacy of the building materials.

The present disclosure is directed to a powder material handling system, depowder system, and a liquid material handling system that are each coupled to an additive manufacturing machine such that the additive manufacturing machine may receive powder and binder material to manufacture a work product using the virgin powder and the binder. These systems, taken together, decrease the time required for the additive manufacturing process by allowing for automated transfer of components such as binders, cleaners, and the like. Further, the precision involved with the additive manufacturing process is improved by transferring these components in an manner, thus avoiding contamination. The safety is also improved by providing a closed system for reactive components such as solvents and exposure potential is decreased.

Referring to FIG. 1, an additive manufacturing system 100 is schematically depicted. The additive manufacturing system 100 includes an additive manufacturing machine 110. The additive manufacturing machine 110 may be, but is not limited to, a binder jet printer, an electron beam manufacturing (EBM) system, a laser manufacturing system, or the like. For the purposes of brevity, the present application discusses the additive manufacturing machine 110 as a binder jet printer, but it should be understood that any other devices or systems may also be used. The additive manufacturing machine 110 may be configured to additively manufacture a work product by layering a powder and applying a binder. The additive manufacturing machine 110 may include a recoater arm (not depicted) for depositing the powder and may include one or more nozzles (not depicted) for depositing the binder onto the powder. The binder may interact with a portion of the powder, e.g. the portion of the powder that contacts the binder, to form solid material. The powder that does not contact the binder may remain in powder form.

The additive manufacturing system 100 also includes a liquid material handling system 120, a powder material handling system 170, and may also include a depowder system 200 where loose powder is removed from a three-dimensional work product. The additive manufacturing machine 110 is fluidly coupled to the liquid material handling system 120, powder material handling system 170, and may also be coupled to the depowder system 200. In this way, the additive manufacturing machine 110 can transfer components such as inert gas and liquid waste to the liquid material handling system 120, while the liquid material handling system 120 may transfer binders and cleaners to the additive manufacturing machine 110.

Similarly, the additive manufacturing machine 110 may transfer inert gas and recovered powder to the powder material handling system 170, while the powder material handling system 170 transfers powder for the additive manufacturing machine 110 to build a work product. The depowder system 200 may also be fluidly coupled to the powder material handling system 170 and the additive manufacturing machine 110. In this way, the depowder system 200 may receive a work product from the additive manufacturing machine 110, and the depowder system 200 may then transfer any recovered powder to the powder material handling system 170. Additional details will be provided in the following paragraphs.

Figure 2A:
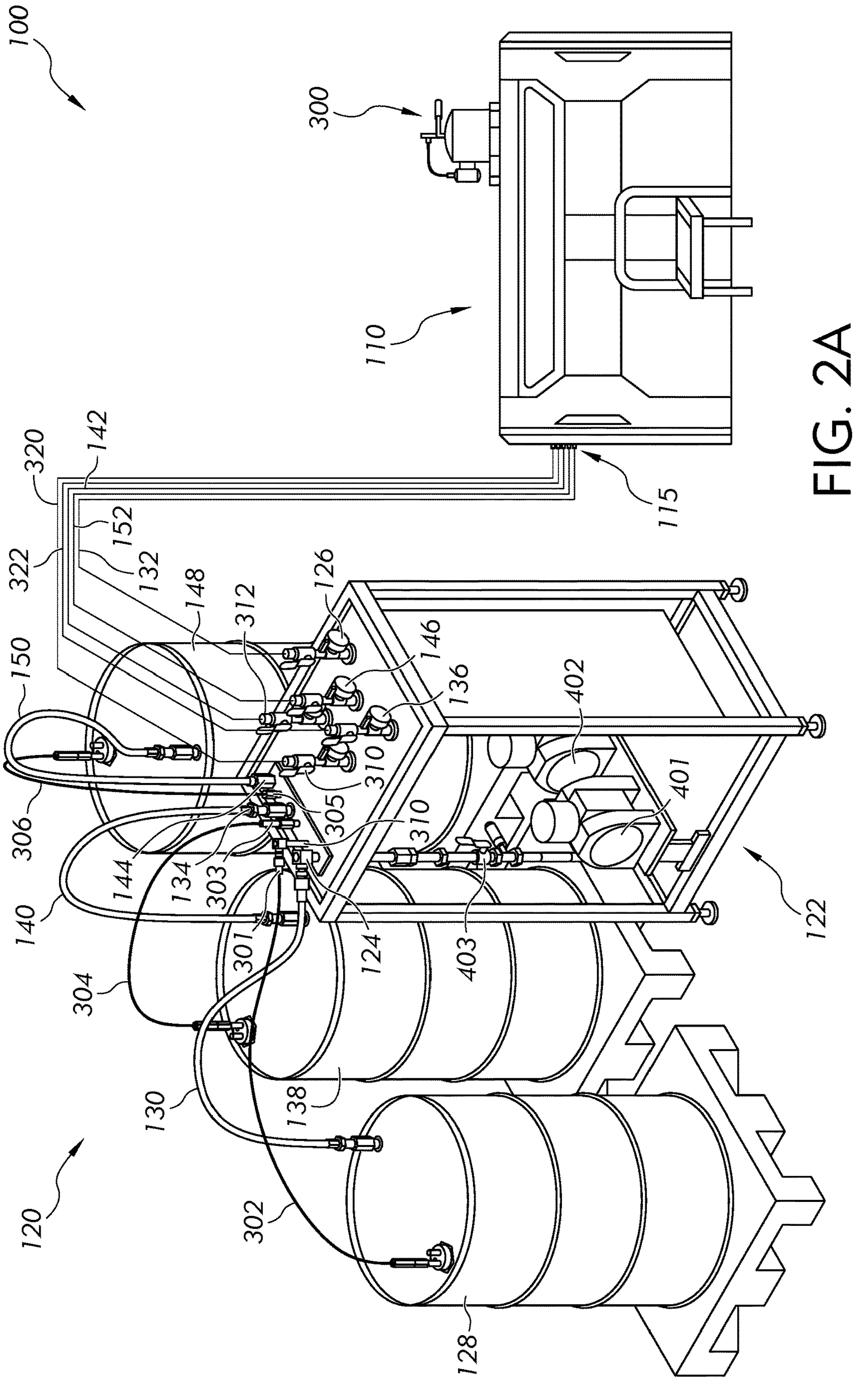
FIG. 2A depicts a perspective view of an illustrative additive manufacturing system including a liquid material handling system and additive manufacturing machine, according to one or more embodiments shown and described herein.

Referring to FIG. 2A, a portion of an additive manufacturing system including a liquid material handling system 120 and an additive manufacturing machine 110 is depicted. The liquid material handling system 120 may include a liquid station 122. In general, the liquid station 122 is a self-contained environment that may include, for example, piping, valves, gauges, pressure regulators, flanges and other components and equipment for executing an additive manufacturing process. The liquid station 122 includes a binder inlet 124 through which binder may be received within the liquid station 122. The liquid station 122 may further include a binder outlet 126 through which the binder may exit the liquid station 122. The liquid station 122 may include at least one pump for delivery and at least one pump for extraction. For example, in the embodiment of FIG. 2A, a first pump 401, and a second pump 402 may provide delivery and extraction. The liquid station 122 also includes one or more valves 403, which, together with the first pump 401 and second pump 402, may control flow of the binder through the binder inlet 124 and the binder outlet 126.

The liquid material handling system 120 includes a binder drum 128, which may contain new or unused binder. Binder may be used within an additive manufacturing process to build a work product. During the build process, a binder is selectively deposited onto a powder bed, bonding areas together to form a solid part one layer at a time. The materials used may be metals, sand, and ceramics that come in a granular form.

The binder drum 128 may be fluidly coupled to the binder inlet 124 via a first binder pipe 130. The binder outlet 126 may be fluidly coupled to the additive manufacturing machine 110 via a second binder pipe 132. Such couplings, the first pump 401, and/or the second pump 402 may allow for binder flow from the binder drum 128, through the first binder pipe 130, into the liquid station 122, through the second binder pipe 132, and into the additive manufacturing machine 110. In this way, the additive manufacturing machine 110 may receive the binder from the liquid material handling system 120 at area 115. Within the additive manufacturing machine 110, the binder may be routed to the one or more nozzles (not depicted) of the additive manufacturing machine 110 such that the one or more nozzles may deposit the binder onto the powder.

In some embodiments, the binder drum 128, the first binder pipe 130, the liquid station 122, the second binder pipe 132, and the additive manufacturing machine 110 may be connected in a gastight manner. As used in this disclosure, "gastight manner" means not allowing gas (e.g., air) to escape or pass through the drums, inlets, outlets, piping, pumps, valves, and systems of the additive manufacturing system. For example, the liquid station 122 may include seals or other connections that prevent gas from escaping or entering the various pipes, valves, pumps, and the like. This may be beneficial in some embodiments as it may decrease the risk of contamination of the binder (e.g., introduction of environmental contaminants into the binder). Additionally, in embodiments where the binder is flammable or chemically reactive, use of sealing components may minimize interaction of the binder with any air or chemicals outside of the liquid material handling system 120, particularly materials that could cause combustion if combined with the binder.

Still referring to FIG. 2A, the additive manufacturing machine 110 may receive a cleaner from the liquid material handling system 120. The cleaner may be a liquid cleaner for cleaning or flushing the one or more nozzles of the additive manufacturing machine 110. In some embodiments, the liquid station 122 may include a cleaner inlet 134 through which cleaner may be received within the liquid station 122 and a cleaner outlet 136 through which the binder may exit the liquid station 122. The liquid station 122 may include a first pump 401 and a second pump 402 and one or more valves 403, which may control flow of the cleaner through the cleaner inlet 134 and the cleaner outlet 136.

The liquid material handling system 120 may include a cleaner drum 138, which may contain the cleaner. The cleaner drum 138 may be fluidly coupled to the cleaner inlet 134 via a first cleaner pipe 140. The cleaner outlet 136 may be fluidly coupled to the additive manufacturing machine 110 via a second cleaner pipe 142. Such couplings may allow for cleaner flow from the cleaner drum 138, through the first cleaner pipe 140, into the liquid station 122, through the second cleaner pipe 142, and into the additive manufacturing machine 110. In this way, the additive manufacturing machine 110 may receive the cleaner from the liquid material handling system 120. Within the additive manufacturing machine 110, the cleaner may be provided to the additive manufacturing machine 110 such that the cleaner may clean or flush the one or more nozzles.

In some embodiments, the additive manufacturing machine 110 may purge the spent liquid cleaner. Accordingly, in some embodiments, the liquid station 122 may include a liquid waste inlet 146 through which liquid waste may be received within the liquid station 122 and a liquid waste outlet 144 through which the liquid waste may exit the liquid station 122. The liquid material handling system 120 may include a waste drum 148, which may contain spent liquid cleaner used to clean, flush, or prevent clogging or damage of the one or more nozzles. The waste drum 148 may be fluidly coupled to the liquid waste outlet 144 via a first waste pipe 150. The additive manufacturing machine 110 may be fluidly coupled to a liquid waste inlet 146 via a second waste pipe 152. Such couplings may allow for spent cleaner to flow from the additive manufacturing machine 110, through the second waste pipe 152, into the liquid station 122, through the first waste pipe 150, and into the waste drum 148. In this way, the waste drum 148 may receive the liquid waste from the additive manufacturing machine 110. The liquid station 122 may include a first pump 401 and a second pump 402 and one or more valves 403, which may control flow of the liquid waste through the liquid waste inlet 146 and the liquid waste outlet 144.

In some embodiments, the additive manufacturing machine 110 may be coupled to a gas supply 300. In particular, the additive manufacturing machine 110 may be coupled to the gas supply 300 in a gastight manner such that air may not enter the additive manufacturing machine 110 and such that gas from the gas supply 300 may be the only gas within the additive manufacturing machine 110. The gas supply 300 may include an inert gas such as nitrogen. Accordingly, in some embodiments, the additive manufacturing machine 110 may not contain air and may instead contain only the inert gas. This may be beneficial in some embodiments as it may prevent contamination of or reaction with the binder.

Figure 2B:
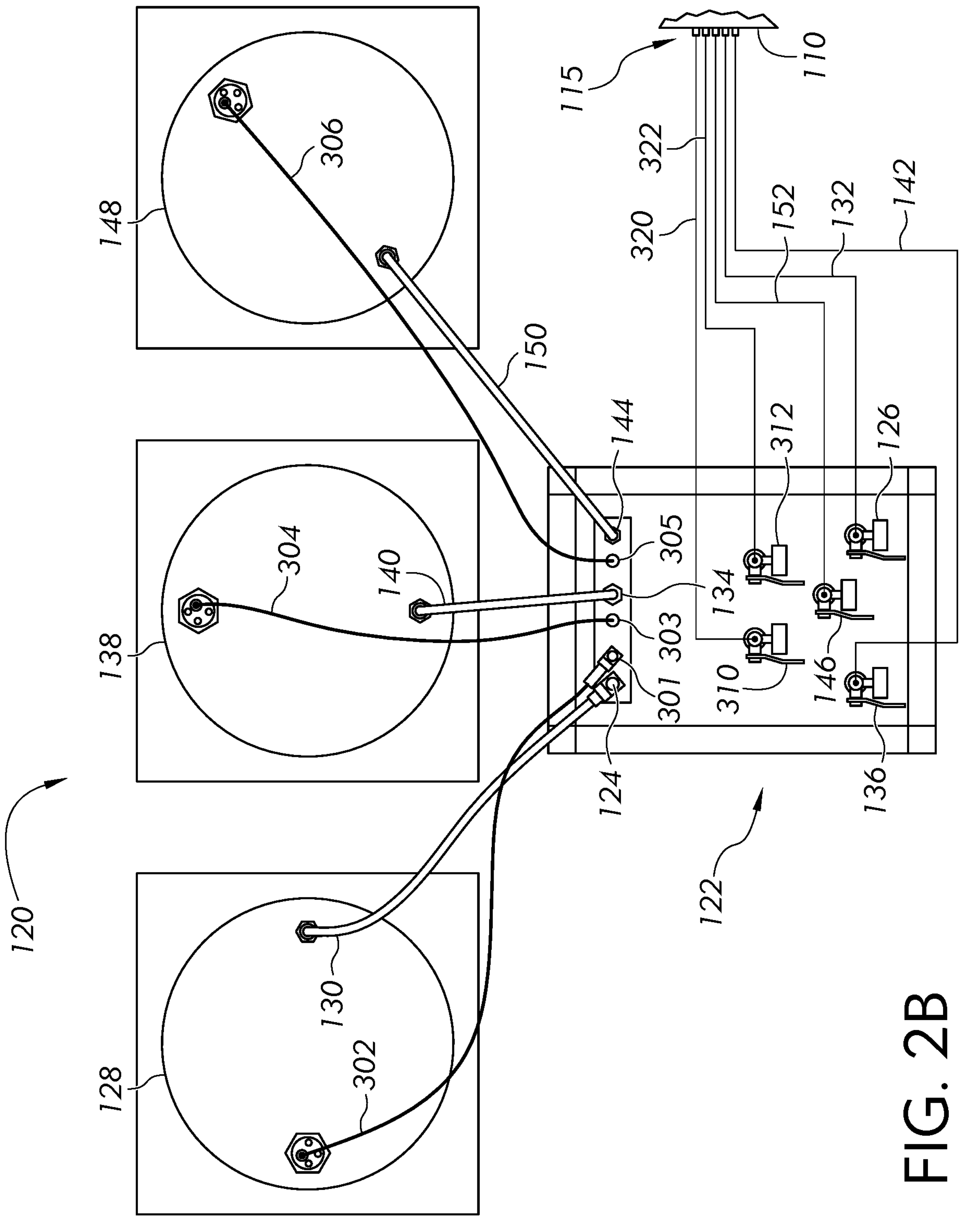
FIG. 2B depicts a top view of the liquid material handling system of FIG. 2A, according to one or more embodiments shown and described herein.

Now referring to FIG. 2B, the additive manufacturing machine 110 may be coupled to the binder drum 128 via a binder gas pipe 302. Specifically, the binder gas pipe 302 may be fluidly coupled to the binder drum 128 and to the liquid station 122 in a gastight manner through a binder gas outlet 301. The additive manufacturing machine 110 may be fluidly coupled to a gas inlet 310 via a gas pipe 320. Such couplings may allow for gas to flow from the additive manufacturing machine 110, through the gas pipe 320, into the liquid station 122, through the binder gas pipe 302, and into the binder drum 128. In this way, the binder drum 128 may receive the gas from the additive manufacturing machine 110. The liquid station 122 may include a first pump 401 (shown in FIG. 2A) and a second pump 402 (shown in FIG. 2A) and one or more valves 403 (shown in FIG. 2A), which may control flow of the gas through the gas inlet 310 and the binder gas outlet 301. Accordingly, as binder is removed from the binder drum 128 via the first binder pipe 130, inert gas may be pulled into the binder drum 128 via the binder gas pipe 302. In other words, the inert gas may fill the vacuum otherwise created by the removal of the binder from the binder drum 128.

As described hereinabove, the binder drum 128, the first binder pipe 130, the liquid station 122, the second binder pipe 132, and the additive manufacturing machine 110 may be connected in a gastight manner. Accordingly, in some embodiments, the binder may move from the binder drum 128 into the additive manufacturing machine 110 without contacting air and without air being introduced into the binder drum 128.

In some such embodiments, the additive manufacturing machine 110 may be coupled to the cleaner drum 138 via a cleaner gas pipe 304. Specifically, the cleaner gas pipe 304 may be fluidly coupled to the cleaner drum 138 and to the liquid station 122 in a gastight manner through a cleaner gas outlet 303. The additive manufacturing machine 110 may be fluidly coupled to a gas inlet 310 via a gas pipe 320. Such couplings may allow for gas to flow from the additive manufacturing machine 110, through the gas pipe 320, into the liquid station 122, through the cleaner gas pipe 304, and into the cleaner drum 138. In this way, the cleaner drum 138 may receive the gas from the additive manufacturing machine 110. The liquid station 122 may include a first pump 401 and a second pump 402 and one or more valves 403, which may control flow of the gas through the gas inlet 310 and the cleaner gas outlet 303. Accordingly, as cleaner is removed from the cleaner drum 138 via the first cleaner pipe 140, inert gas may be pulled into the cleaner drum 138 via the cleaner gas pipe 304. In other words, the inert gas may fill the vacuum otherwise created by the removal of the cleaner from the cleaner drum 138.

As described hereinabove, the cleaner drum 138, the first cleaner pipe 140, the liquid station 122, the second cleaner pipe 142, and the additive manufacturing machine 110 may be connected in a gastight manner. Accordingly, it will now be appreciated that, in some embodiments, the cleaner may move from the cleaner drum 138 and into the additive manufacturing machine 110 without contacting air and without air being introduced into the cleaner drum 138.

Still referring to FIG. 2B, the additive manufacturing machine 110 may be coupled to the waste drum 148 via a waste gas pipe 306. Specifically, the gas waste pipe 306 may be coupled to the waste drum 148 and to the additive manufacturing machine 110 in a gastight manner, e.g. with seals, valves, or other gastight connections. The waste gas pipe 306 may be configured and positioned to supply the inert gas from the additive manufacturing machine 110 to the waste drum 148. Accordingly, as cleaner is removed from the waste drum 148 via the first waste pipe 150, inert gas may be pulled into the waste drum 148 via the waste gas pipe 306. In other words, the inert gas may fill the vacuum otherwise created by the removal of the cleaner from the waste drum 148.

In some such embodiments, the additive manufacturing machine 110 may be coupled to the waste drum 148 via a waste gas pipe 306. Specifically, the waste gas pipe 306 may be fluidly coupled to the waste drum 148 and to the liquid station 122 in a gastight manner through a waste gas inlet 305. The additive manufacturing machine 110 may be fluidly coupled to a gas outlet 312 via a gas pipe 322. Such couplings may allow for gas to flow from the waste drum 148, through the waste gas pipe 306, into the liquid station 122, through the gas pipe 322, and into the additive manufacturing machine 110. The liquid station 122 may include a first pump 401 (not shown) and a second pump 402 (not shown) and one or more valves 403 (not shown), which may control flow of the gas through the waste gas inlet 305 and the gas outlet 312. Accordingly, as liquid waste is added to the waste drum 148 via the first waste pipe 150, inert gas may be pulled from the waste drum 148 via the waste gas pipe 306. In other words, the inert gas may be removed from the waste drum 148 as liquid waste is added to the waste drum 148 to maintain an inert environment.

As described hereinabove, the waste drum 148, the first waste pipe 150, the liquid station 122, the second waste pipe 152, and the additive manufacturing machine 110 may be connected in a gastight manner. Accordingly, it will now be appreciated that, in some embodiments, the waste may move from the waste drum 148 and into the additive manufacturing machine 110 without contacting air and without air being introduced into the waste drum 148.

Figure 3:
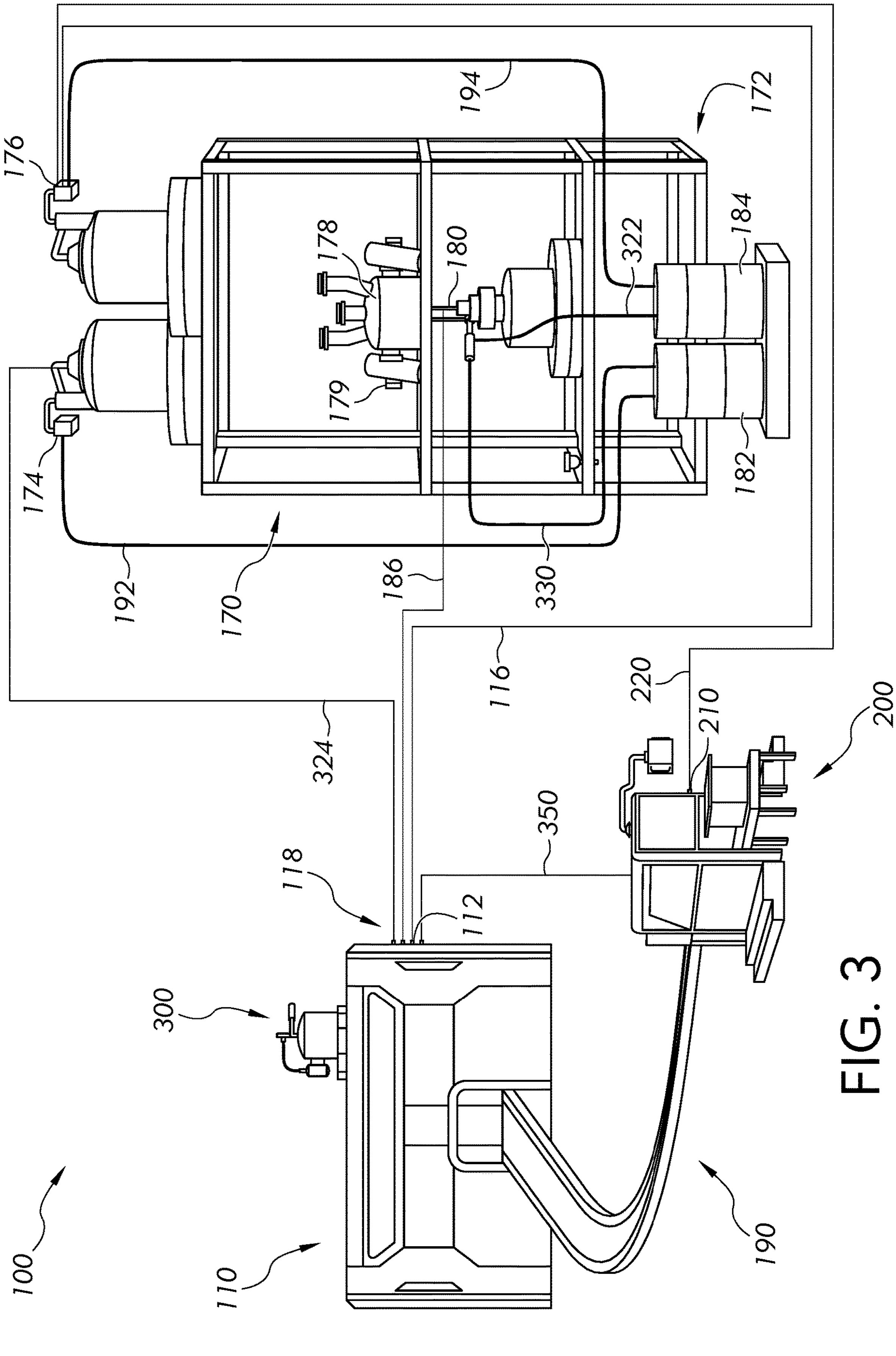
FIG. 3 depicts a perspective view of an illustrative additive manufacturing system including a powder material handling system, a depowder system, and additive manufacturing machine, according to one or more embodiments shown and described herein.

Referring now to FIG. 3, a portion of an additive manufacturing system 100 including a powder material handling system 170, an additive manufacturing machine 110, and depowder system 200, is depicted. The powder material handling system 170 may include a powder station 172. In general, a powder station may be a self-contained environment that includes piping, valves, gauges, pressure regulators, flanges and other necessary components and equipment required to execute the additive manufacturing process. In some embodiments, the powder station 172 includes a virgin powder inlet 174 through which virgin powder is received within the powder station 172. The powder station 172 may also include a recovered powder inlet 176 through which recovered powder, or powder that has previously been used, may be received within the powder station 172. In some embodiments, the additive manufacturing machine 110 may include a recovered powder outlet 112, and the recovered powder inlet 176 may be coupled to the recovered powder outlet 112 via a first recovered powder pipe 116.

The powder station 172 may include a sieve 178, which may combine the recovered powder and the virgin powder to form a blended powder by blending the recovered powder and the virgin powder, filtering oversized particles from the blended powder using the sieve 178, transferring the oversized particles to a powder outlet 179, and transferring the blended powder to the additive manufacturing machine 110. The powder station 172 may include a powder outlet 180, through which blended powder may exit the powder station 172. The powder station 172 may include a waste/oversized powder outlet 179 through which powder that is oversized may exit the powder station 172. The powder station 172 may include one or more pumps (not depicted) and one or more valves (not depicted), which may control flow of the powders, e.g., the virgin powder, the recovered powder, and the blended powder, through the powder station 172.

In some embodiments, the powder material handling system 170 may not include a recovered powder inlet 176 or a sieve 178. In such embodiments, the virgin powder enters the powder station 172 through the virgin powder inlet 174 and exits the powder station 172 through the powder outlet 180 without combining with a recovered powder. In this way, the additive manufacturing machine 110 may receive the virgin powder from the powder material handling system 170 to manufacture a work product.

Figure 4:
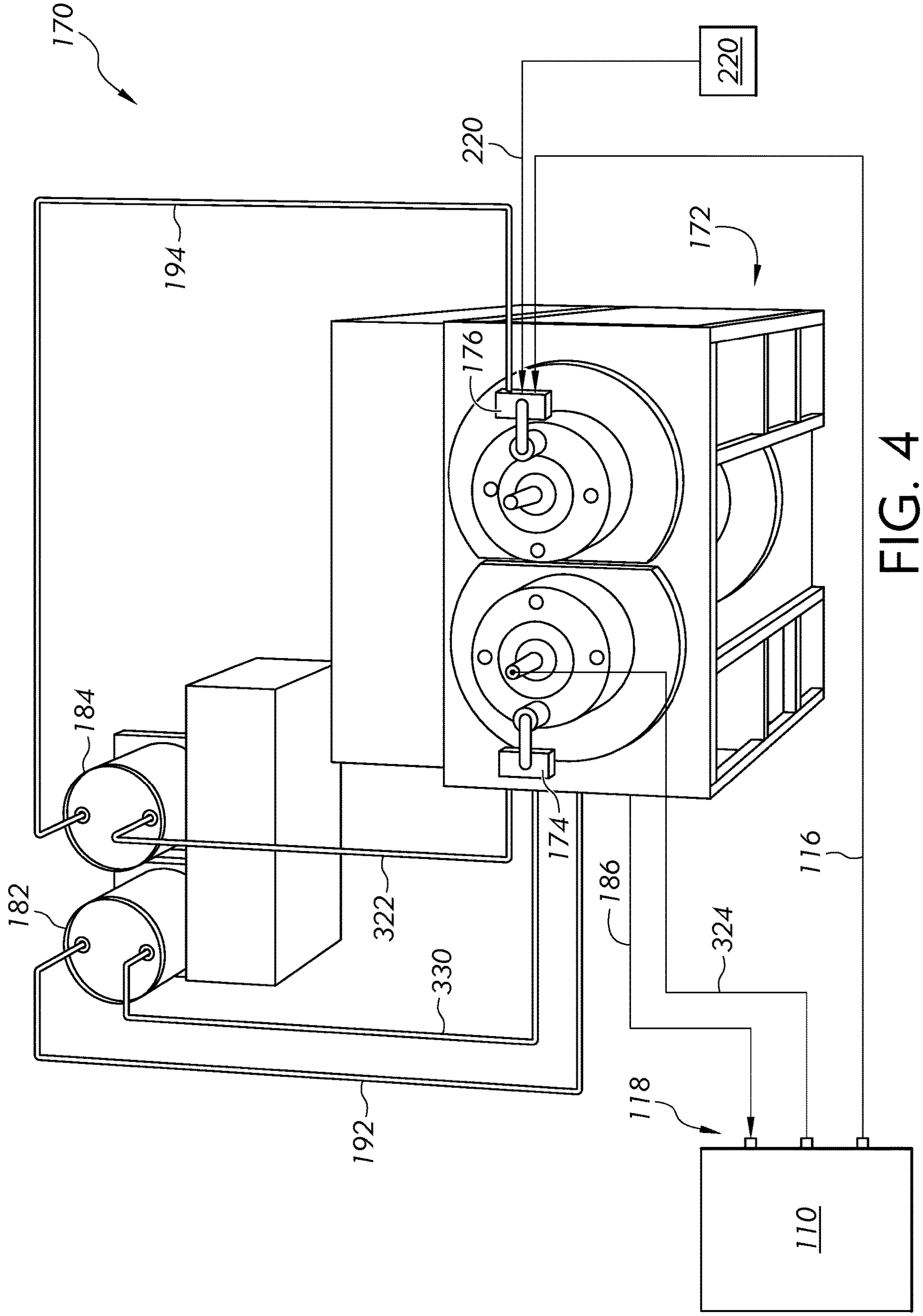
FIG. 4 depicts a top view of the powder material handling system of FIG. 3, according to one or more embodiments shown and described herein.

Now referring to FIG. 4, the powder material handling system 170 includes a virgin powder drum 182, which contains virgin, or unused, powder. The virgin powder drum 182 may be coupled to the virgin powder inlet 174 through a virgin powder pipe 192. The powder material handling system 170 may also include a recovered powder drum 184, which may be coupled to the recovered powder inlet 176 through a second recovered powder pipe 194. The powder outlet 180 of the powder station 172 may be coupled to the additive manufacturing machine 110 via a powder transport pipe 186. In this way, the additive manufacturing machine 110 may receive powder, e.g. a blended powder including the virgin powder and the recovered powder, from the powder material handling system 170 at area 118. Within the additive manufacturing machine 110, the powder may be routed to the recoater arm (not depicted) of the additive manufacturing machine 110 such that the recoater arm may deposit the powder within the additive manufacturing machine 110.

In some embodiments, the powder material handling system 170 may be coupled to the virgin powder drum 182 via a virgin powder gas pipe 330. Specifically, the virgin powder gas pipe 330 may be fluidly coupled to the virgin powder drum 182 and to the powder station 172 in a gastight manner (not depicted). The additive manufacturing machine 110 may be fluidly coupled to the powder station 172 via a gas pipe 324. Such couplings may allow for gas to flow from the additive manufacturing machine 110, through the gas pipe 324, into the powder station 172, through the virgin powder gas pipe 330, and into the virgin powder drum 182. In this way, the virgin powder drum 182 may receive the gas from the powder material handling system 170. Accordingly, as virgin powder is removed from the virgin powder drum 182 and into the powder station 172 via the virgin powder inlet 174, inert gas may be pulled into the virgin powder drum 182 via the virgin powder gas pipe 330. In other words, the inert gas may fill the vacuum otherwise created by the removal of the virgin powder from the virgin powder drum 182.

The powder material handling system 170 may be coupled to the recovered powder drum 184 via a recovered powder gas pipe 332. Specifically, the recovered powder gas pipe 332 may be fluidly coupled to the recovered powder drum 184 and to the powder station 172 in a gastight manner (not depicted). The additive manufacturing machine 110 may be fluidly coupled to the powder station 172 via a gas pipe 324. Such couplings may allow for gas to flow from the additive manufacturing machine 110, through the gas pipe 324, into the powder station 172, through the recovered powder gas pipe 332, and into the recovered powder drum 184. In this way, the recovered powder drum 184 may receive the gas from the powder material handling system 170. Accordingly, as recovered powder is removed from the recovered powder drum 184 and into the powder station 172 via the recovered powder inlet 176, inert gas may be pulled into the recovered powder drum 184 via the recovered powder gas pipe 332. In other words, the inert gas may fill the vacuum otherwise created by the removal of the recovered powder from the recovered powder drum 184.

In some embodiments, the virgin powder drum 182 and the recovered powder drum 184 may each be coupled to the powder station 172 in a gastight manner. Similarly, the powder station 172, the powder transport pipe 186, and the additive manufacturing machine 110 may be connected in a gastight manner. For example, the additive manufacturing system 100 may include seals and/or other gastight connections. This may be beneficial in some embodiments as it may decrease the risk of contamination of the powder.

Referring again to FIG. 3, a portion of an additive manufacturing system 100 is depicted including an additive manufacturing machine 110 and a powder material handling system 170. The additive manufacturing system 100 may also include a depowder system 200 where loose powder is removed from a three-dimensional work product. In some embodiments, the additive manufacturing machine 110 may transfer a work product (not shown) via a conveyor system 190 to the depowder system 200. Other means of transferring work product are contemplated and are considered part of this disclosure, such as a manual transfer with a forklift or an automated vehicle. In some embodiments, the depowder system 200 may be coupled to the powder material handling system 170. The depowder system 200 may include a recovered powder outlet 210 through which recovered powder, or powder that has previously been used, may be transferred via a second recovered powder pipe 220 to the recovered powder inlet 176 of the powder station 172 within the powder material handling system 170.

The recovered powder delivered to the powder station 172 from the depowder system 200 may then be sieved via the sieve 178 to combine the recovered powder with virgin powder to create a blended powder. The blended powder may then flow from the powder station 172 to the additive manufacturing machine 110 through powder outlet 180 and powder transport pipe 186. In this way, the additive manufacturing machine 110 may receive recovered powder from the depowder system 200 at the area 118.

In some embodiments, the depowder system 200 may be coupled to the additive manufacturing machine 110 in a gastight manner through a depowder gas pipe 350. In another embodiment, the depowder station may have a depowder gas pipe connected outside of the additive manufacturing system 100 to its own supply source. Regardless of the source of gas in the depowder system 200, a gastight connection is maintained through the use of the seals or other gastight connections (not depicted). This may be beneficial in some embodiments as it may decrease the risk of contamination of the powder.

Figure 5:
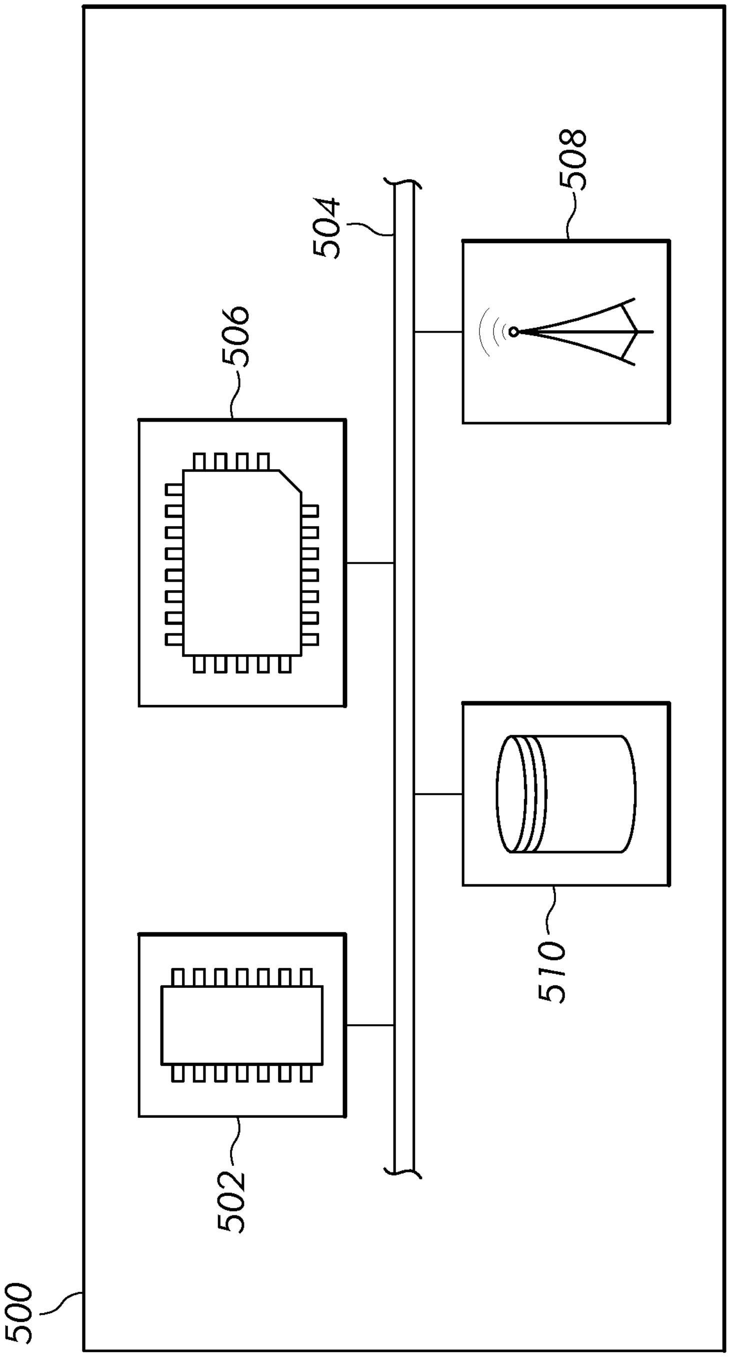
FIG. 5 schematically depicts illustrative internal components of a control system for the additive manufacturing system, according to one or more embodiments shown and described herein.

FIG. 5 depicts a control system 500 that may be included in the additive manufacturing system 100. In the example of FIG. 5, the additive manufacturing system 100 includes one or more processors 502, a communication path 504, one or more memory modules 506, a network interface hardware 508, and a data storage component 510, the details of which will be set forth in the following paragraphs.

Each of the one or more processors 502 may be any device capable of executing machine readable and executable instructions. Accordingly, each of the one or more processors 502 may be a controller, an integrated circuit, a microchip, a computer, or any other computing device.

The one or more processors 502 are coupled to a communication path 504 that provides signal interconnectivity between various modules of the additive manufacturing system 100. Accordingly, the communication path 504 may communicatively couple any number of processors 502 with one another, and allow the modules coupled to the communication path 504 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 504 may be formed from any medium that is capable of transmitting a signal such as, for example, conductive wires, conductive traces, optical waveguides, or the like. In some embodiments, the communication path 504 may facilitate the transmission of wireless signals, such as Wi-Fi, Bluetooth®, Near Field Communication (NFC) and the like. Moreover, the communication path 504 may be formed from a combination of mediums capable of transmitting signals. In one embodiment, the communication path 504 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The additive manufacturing system 100 includes one or more memory modules 506 coupled to the communication path 504. The one or more memory modules 506 may comprise RAM, ROM, flash memories, hard drives, or any device capable of storing machine readable and executable instructions such that the machine readable and executable instructions can be accessed by the one or more processors 502. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 506. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 5, the additive manufacturing system 100 includes network interface hardware 508. In some examples, the network interface hardware 508 may also couple additive manufacturing system 100 to one or more other external devices including, such as a remote computing device (e.g., a cloud server or edge server) or other vehicles. The network interface hardware 508 can be communicatively coupled to the communication path 504 and can be any device capable of transmitting and/or receiving data via a network or via a hard-wired connection (e.g., a cable connection). In some examples, the network interface hardware 508 can include a communication transceiver for sending and/or receiving any wired or wireless communication. For example, the network interface hardware 508 may include an antenna, a modem, LAN port, Wi-Fi card, WiMax card, mobile communications hardware, near-field communication hardware, satellite communication hardware and/or any wired or wireless hardware for communicating with other networks and/or devices.

The additive manufacturing system 100 also includes a data storage component 510. The data storage component 510 may store data used by various components of the additive manufacturing system 100. The control system 500 may be utilized to carry out various processes, such as the processes described hereinbelow with respect to FIG. 6.

Figure 6:
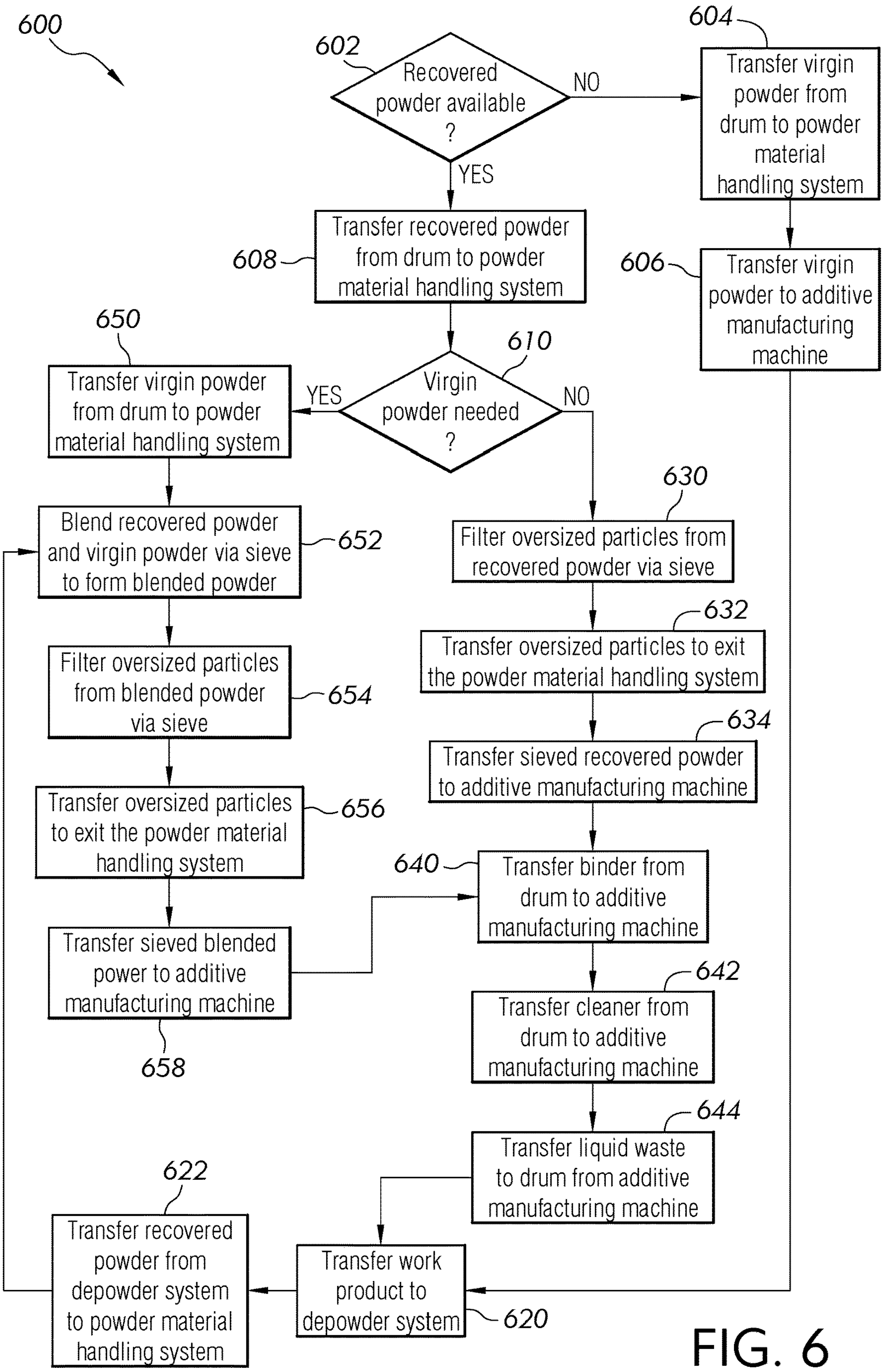
FIG. 6 depicts a flowchart of an example method of operating an additive manufacturing system according to one or more embodiments shown and described herein.

FIG. 6 depicts a flowchart of an example method 600 of operating an additive manufacturing system 100. At block 602, a controller determines whether recovered powder is available to manufacture a work product. If the controller detects no recovered powder, the controller will direct the system to block 604, where virgin powder is transferred from the virgin powder drum 182 to the powder material handling system 170. For example, the virgin powder moves along the virgin powder pipe 192 to the virgin powder inlet 174 on the powder station 172. At block 606, virgin powder is transferred to the additive manufacturing machine. Referring back to FIG. 3, the powder station 172 includes the powder outlet 180 that is coupled to the additive manufacturing machine 110 via the powder transport pipe 186. For example, the virgin powder moves from the powder station 172 to the powder outlet 180 and then through the powder transport pipe 186 to the additive manufacturing machine 110.

At block 620, the work product is then transferred from the additive manufacturing machine to the depowder system. For example, the work product may exit the additive manufacturing machine 110 and may move along the conveyor system 190 until it reaches the depowder system 200. At block 622, the recovered powder from the depowder system is transferred to the powder material handling system for use future builds. For example, the depowder system 200 may recover powder from the work product, and the recovered powder may move along the second recovered powder pipe 220 to the recovered powder inlet 176 of the powder station 172 within the powder material handling system 170.

At block 652, the recovered powder and the virgin powder may be blended via the sieve 178 to form a blended powder. For example, the recovered powder and the virgin powder may move along the powder station 172 and both the recovered powder and the virgin powder are directed through the sieve 178 to form a blended powder. At block 654, the blended powder may be filtered via the sieve 178 to remove oversized particles from the blended powder. For example, the sieve may allow particularly sized powders from both the recovered powder and the virgin powder to fall through the sieve 178 to form a blended powder below.

At block 656, oversized particles may be transferred out of the powder material handling system 170 via the outlet 179. For example, the oversized particles may move along the powder station 172 to an outlet 179 to exit the powder station 172. At block 658, the sieved blended powder may be transferred to the additive manufacturing machine 110 via the powder transport pipe 186. For example, the blended powder may move along the powder station 172 and may move through the powder outlet 180. The blended powder may continue to move through powder transport pipe 186 until it reaches the additive manufacturing machine 110.

However, if the controller determines at block 602 that there is recovered powder for manufacturing a work product, the controller will direct the system to block 608, where recovered powder is transferred from the drum to the powder material handling system. For example, the recovered powder moves along the recovered powder pipe 194 to the recovered powder inlet 176 on the powder station 172.

At block 610, the controller determines whether virgin powder is also needed manufacture a work product. If a virgin powder is not needed, the controller will direct the system to filter the oversized particles from the recovered powder via a sieve at block 630. For example, the sieve may allow desired-sized powders from the recovered powder to fall through the sieve 178 to form a sieved recovered powder below.

At block 632, the oversized particles are transferred out of the powder material handling system. For example, the oversized particles may move along the powder station 172 to an outlet 179 to exit the powder station 172. At block 634, the sieved recovered powder is transferred to the additive manufacturing machine. At block 640, the binder may be transferred to the additive manufacturing machine 110. For example, binder may be transferred from the binder drum 128 to the liquid material handling system 120 via the first binder pipe 130. That is, the binder may move along the first binder pipe 130 and enter the liquid station 122 at the binder inlet 124. The binder may be transferred to the additive manufacturing machine 110 via a second binder pipe 132. For example, the binder may exit the liquid station 122 at the binder outlet 126, and the binder may move along the second binder pipe 132 to the additive manufacturing machine 110.

Blocks 640, 642, and 644 are shown in series in FIG. 6, but these steps may occur in any order, or substantially simultaneously. The ability of these steps to occur substantially simultaneously is limited by the number of pumps in the system. At block 630, cleaner may be transferred from the cleaner drum 138 to the liquid material handling system 120 via the first cleaner pipe 140. For example, the cleaner may move along the first cleaner pipe 140 and enter the liquid station 122 at the cleaner inlet 134. At block 632, the cleaner may be transferred from the liquid material handling system 120 to the additive manufacturing machine 110 via a second cleaner pipe 142. For example, the cleaner may exit the liquid station 122 at the cleaner outlet 136, and the binder may move along the second cleaner pipe 142 to the additive manufacturing machine 110.

At block 644, liquid waste may be transferred to the waste drum 148 from the additive manufacturing machine 110 via a second waste pipe 152 and first waste pipe 150. For example, the liquid waste may move along the second waste pipe 152 to the liquid waste inlet 146 on liquid station 122. Then, the liquid waste may exit the liquid station 122 at the liquid waste outlet 144 and move along the first waste pipe 150 to enter the waste drum 148.

If virgin powder is needed at block 610, then the controller will direct the system to block 650 to transfer virgin powder from a drum to a powder material handling system. For example, the virgin powder moves along the virgin powder pipe 194 to the recovered powder inlet 176 on the powder station 172. Then the controller directs the system to block 652, where the recovered powder and the virgin powder may be blended via the sieve 178 to form a blended powder. Blocks 654, 656, 658, 640, and 644 may follow as well. The details of such blocks are described hereinabove.

It should be appreciated that, given the foregoing description, powder that is used for article formation can be obtained from virgin powder, recovered powder, or a combination of virgin powder and recovered powder (e.g., the blended powder).

In view of the above, it should now be understood that at least some embodiments of the present disclosure are directed to an additive manufacturing system comprising a powder material handling system comprising a virgin powder inlet. The virgin powder inlet is coupled to a virgin powder drum and configured to receive a virgin powder from the virgin powder drum. The additive manufacturing system further comprises a liquid material handling system comprising a binder inlet. The binder inlet is coupled to a binder drum and configured to receive a binder from the binder drum. The additive manufacturing system also comprises an additive manufacturing machine coupled to the powder material handling system and the liquid material handling system. The additive manufacturing machine receives the virgin powder from the powder material handling system and receives the binder from the liquid material handling system. The additive manufacturing machine is also configured to manufacture a work product using the virgin powder and the binder. As stated above, this system provides advantages over the prior art such as time saved, improved process efficacy, and increased safety due to the automated nature and gastight design.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects are provided by the subject matter of the following clauses:

An additive manufacturing system comprising: a powder material handling system comprising a virgin powder inlet coupled to a virgin powder drum and configured to receive a virgin powder from the virgin powder drum; a liquid material handling system comprising a binder inlet coupled to a binder drum and configured to receive a binder from the binder drum; and an additive manufacturing machine coupled to the powder material handling system and the liquid material handling system such that the additive manufacturing machine receives the virgin powder from the powder material handling system and receives the binder from the liquid material handling system, wherein the additive manufacturing machine is configured to manufacture a work product using the virgin powder and the binder.

The additive manufacturing system of the preceding clause, wherein the additive manufacturing machine is coupled to the powder material handling system via a gastight coupling.

The additive manufacturing system of any preceding clause, wherein the additive manufacturing machine is coupled to the liquid material handling system via a gastight coupling.

The additive manufacturing system of any preceding clause, wherein: the additive manufacturing machine comprises a recovered powder outlet; and the powder material handling system comprises a recovered powder inlet coupled to the recovered powder outlet such that the powder material handling system receives a recovered powder from the additive manufacturing machine.

The additive manufacturing system of any preceding clause, further comprising a depowder system coupled to the powder material handling system, wherein the powder material handling system receives a recovered powder from the depowder system.

The additive manufacturing system of any preceding clause, wherein the powder material handling system comprises a sieve that is configured to blend the recovered powder and virgin powder together to form a blended powder output.

The additive manufacturing system of any preceding clause, wherein the liquid material handling system further comprises a cleaner inlet, the cleaner inlet coupled to a cleaner drum such that the cleaner inlet receives a cleaner from the cleaner drum.

The additive manufacturing system of any preceding clause, wherein the additive manufacturing machine is fluidly coupled to the liquid material handling system such that the additive manufacturing machine receives the cleaner from the liquid material handling system.

The additive manufacturing system of any preceding clause, wherein: the additive manufacturing machine comprises a liquid waste outlet coupled to a waste drum, wherein a liquid waste is output from the additive manufacturing machine to the waste drum via the liquid waste outlet.

An additive manufacturing system comprising: a powder material handling system comprising: a virgin powder inlet coupled to a powder drum such that the virgin powder inlet receives a virgin powder from the powder drum; a first recovered powder inlet configured to receive a first recovered powder; and a sieve configured to blend the first recovered powder and the virgin powder together to form a blended powder output; a liquid material handling system having a binder; and an additive manufacturing machine coupled to the powder material handling system and the liquid material handling system such that the additive manufacturing machine receives the blended powder output from the powder material handling system and receives the binder from the liquid material handling system, wherein the additive manufacturing machine is configured to manufacture a work product using the blended powder and the binder.

The additive manufacturing system of the preceding clause, further comprising a depowder system coupled to the powder material handling system, wherein the powder material handling system receives a recovered powder from the depowder system.

The additive manufacturing system of any preceding clause, wherein: the additive manufacturing machine comprises a recovered powder outlet; and the powder material handling system comprises a recovered powder inlet coupled to the recovered powder outlet of the additive manufacturing machine such that the powder material handling system receives a recovered powder from the additive manufacturing machine.

A method of using an additive manufacturing system, the method comprising: transferring a virgin powder from a virgin powder drum to a powder material handling system in a gastight manner, wherein the powder material handling system comprises a virgin powder inlet, the virgin powder inlet coupled to a virgin powder drum such that the virgin powder inlet receives the virgin powder from the virgin powder drum; and transferring the virgin powder from the powder material handling system to an additive manufacturing machine in a gastight manner.

The method of using an additive manufacturing system of the preceding clause, further comprising: transferring a binder from a binder drum to a liquid material handling system in a gastight manner, wherein the liquid material handling system comprises a binder inlet, the binder inlet coupled to the binder drum such that the binder inlet receives the binder from the binder drum; and transferring the binder from the liquid material handling system to the additive manufacturing machine in a gastight manner.

The method of using an additive manufacturing system of any preceding clause, further comprising: transferring a cleaner from a cleaner drum to a liquid material handling system in a gastight manner, wherein the liquid material handling system comprises a cleaner inlet, the cleaner inlet coupled to a cleaner drum such that the cleaner inlet receives the cleaner from the cleaner drum; and transferring the cleaner from the liquid material handling system to the additive manufacturing machine in a gastight manner.

The method of using an additive manufacturing system of any preceding clause, further comprising: transferring a liquid waste to a waste drum via a liquid waste outlet coupled to the additive manufacturing machine.

The method of using an additive manufacturing system of any preceding clause, further comprising: transferring a recovered powder via a recovered powder outlet coupled to the additive manufacturing machine to a recovered powder inlet coupled to the powder material handling system.

The method of using an additive manufacturing system of any preceding clause, further comprising: blending the recovered powder and the virgin powder together using a sieve within the powder material handling system to form a blended powder output; filtering oversized particles from the blended powder using the sieve; transferring the oversized particles to an outlet; and transferring the blended powder to the additive manufacturing machine.

The method of using an additive manufacturing system of any preceding clause, further comprising: transferring a work product from the additive manufacturing machine to a depowder system; transferring a recovered powder from the depowder system to the powder material handling system; blending the recovered powder and the virgin powder together using a sieve within the powder material handling system to form a blended powder output; filtering oversized particles from the blended powder using the sieve; transferring the oversized particles to an outlet; and transferring the blended powder to the additive manufacturing machine.

The method of using an additive manufacturing system of any preceding clause, further comprising: transferring a cleaner via a cleaner inlet coupled to a cleaner drum to the liquid material handling system, wherein the additive manufacturing machine is coupled to the liquid material handling system; and transferring a liquid waste to a waste drum via a liquid waste outlet coupled to the additive manufacturing machine.

A method of assembling an additive manufacturing system, comprising: coupling a virgin powder drum to a virgin powder inlet of the additive manufacturing system; and coupling a binder drum to a binder inlet of the additive manufacturing system, wherein the additive manufacturing system comprises: a powder material handling system comprising the virgin powder inlet, the virgin powder inlet configured to receive a virgin powder from the virgin powder drum; a liquid material handling system comprising a binder inlet, the binder inlet configured to receive a binder from the binder drum; and an additive manufacturing machine coupled to the powder material handling system and the liquid material handling system, wherein the additive manufacturing machine is configured to manufacture a work product using the virgin powder and the binder.

A powder material handling system, comprising: a powder station comprising a virgin powder inlet, the virgin powder inlet coupled to a virgin powder drum such that the virgin powder inlet receives a virgin powder from the virgin powder drum; an additive manufacturing machine coupled to the powder material handling system.

The powder material handling system of the preceding clause, further comprising: a first recovered powder inlet coupled to the powder station, the first recovered powder inlet configured to receive a first recovered powder; and a sieve, wherein the first recovered powder and the virgin powder are blended together using the sieve to form a blended powder output.

The powder material handling system of any preceding clause, further comprising: a depowder system coupled to the powder material handling system, wherein the powder material handling system receives a recovered powder from the depowder system.

A liquid material handling system, comprising: a liquid station comprising a binder inlet, the binder inlet coupled to a binder drum such that the binder inlet receives a binder from the binder drum; an additive manufacturing machine coupled to the liquid material handling system.

The liquid material handling system of the preceding clause, further comprising: a cleaner inlet coupled to the liquid station, the cleaner inlet coupled to a cleaner drum such that the cleaner inlet receives a cleaner from the cleaner drum.

The liquid material handling system of any preceding clause, further comprising: a waste inlet coupled to the liquid station, the waste inlet coupled to the additive manufacturing machine such that the waste inlet receives a liquid waste from the additive manufacturing machine; a waste drum coupled to the liquid station such that the waste drum receives a liquid waste from the liquid station.

A method of using an additive manufacturing system, the method comprising: transferring a recovered powder from a recovered powder drum to a powder material handling system in a gastight manner, wherein the powder material handling system comprises a recovered powder inlet, the recovered powder inlet coupled to the recovered powder drum such that the recovered powder inlet receives the recovered powder from the recovered powder drum; and transferring the recovered powder from the powder material handling system to an additive manufacturing machine in a gastight manner.

What is claimed is:

1. An additive manufacturing system comprising:

a powder material handling system comprising a virgin powder inlet coupled to a virgin powder drum and configured to receive a virgin powder from the virgin powder drum;

a liquid material handling system comprising a binder inlet coupled to a binder drum and configured to receive a binder from the binder drum; and an additive manufacturing machine coupled to the powder material handling system and the liquid material handling system such that the additive manufacturing machine receives the virgin powder from the powder material handling system and receives the binder from the liquid material handling system, wherein the additive manufacturing machine is configured to manufacture a work product using the virgin powder and the binder, wherein;

the liquid material handling system comprises:

a waste drum;

a liquid waste inlet fluidly coupled to the additive manufacturing machine;

a liquid waste outlet fluidly coupled to the waste drum; and at least one pump fluidly coupled to the liquid waste inlet and the liquid waste outlet, the at least one pump configured to control flow of a liquid waste from the additive manufacturing machine to the waste drum, wherein each of the liquid material handling system, the powder material handling system, and the additive manufacturing machine are self-contained and spaced from one another.

2. The additive manufacturing system of claim 1, wherein the additive manufacturing machine is coupled to the powder material handling system via at least one gastight coupling.

3. The additive manufacturing system of claim 1, wherein the additive manufacturing machine is coupled to the liquid material handling system via at least one gastight coupling.

4. The additive manufacturing system of claim 1, wherein:

the additive manufacturing machine comprises a recovered powder outlet; and the powder material handling system comprises a recovered powder inlet coupled to the recovered powder outlet such that the powder material handling system receives a recovered powder from the additive manufacturing machine.

5. The additive manufacturing system of claim 1 further comprising a depowder system coupled to the powder material handling system, wherein the powder material handling system receives a recovered powder from the depowder system.

6. The additive manufacturing system of claim 5, wherein the powder material handling system comprises a sieve that is configured to blend the recovered powder and virgin powder together to form a blended powder output.

7. The additive manufacturing system of claim 1, wherein the liquid material handling system further comprises a cleaner inlet, the cleaner inlet coupled to a cleaner drum such that the cleaner inlet receives a cleaner from the cleaner drum.

8. The additive manufacturing system of claim 7, wherein the additive manufacturing machine is fluidly coupled to the liquid material handling system such that the additive manufacturing machine receives the cleaner from the liquid material handling system.

9. An additive manufacturing system comprising:

a powder material handling system comprising:

a virgin powder inlet coupled to a virgin powder drum such that the virgin powder inlet receives a virgin powder from the virgin powder drum;

a first recovered powder inlet configured to receive a first recovered powder;

a sieve configured to blend the first recovered powder and the virgin powder together to form a blended powder output and filter out a waste powder output; and a powder outlet configured to transfer the waste powder output out of the powder material handling system;

a liquid material handling system having a binder; and an additive manufacturing machine coupled to the powder material handling system and the liquid material handling system such that the additive manufacturing machine receives the blended powder output from the powder material handling system and receives the binder from the liquid material handling system, wherein the additive manufacturing machine is configured to manufacture a work product using the blended powder and the binder, wherein each of the liquid material handling system, the powder material handling system, and the additive manufacturing machine are self-contained and spaced from one another.

10. The additive manufacturing system of claim 9 further comprising a depowder system coupled to the powder material handling system, wherein the powder material handling system receives a recovered powder from the depowder system.

11. The additive manufacturing system of claim 9, wherein:

the additive manufacturing machine comprises a recovered powder outlet; and the powder material handling system comprises a recovered powder inlet coupled to the recovered powder outlet of the additive manufacturing machine such that the powder material handling system receives a recovered powder from the additive manufacturing machine.

12. The additive manufacturing system of claim 1, further comprising a conveyor system configured to transfer the work product from the additive manufacturing machine.

* * * * *